US011412059B2

(12) United States Patent
Xie et al.

(10) Patent No.: US 11,412,059 B2
(45) Date of Patent: Aug. 9, 2022

(54) TECHNOLOGIES FOR PARAVIRTUAL NETWORK DEVICE QUEUE AND MEMORY MANAGEMENT

(71) Applicant: INTEL CORPORATION, Santa Clara, CA (US)

(72) Inventors: Huawei Xie, Shanghai (CN); Jun Nakajima, San Ramon, CA (US); David E. Cohen, Hull, MA (US); Mesut A. Ergin, Portland, OR (US); Wei Wang, Auburn, AL (US)

(73) Assignee: INTEL CORPORATION, Santa Clara, CA (US)

( * ) Notice: Subject to any disclaimer, the term of this patent is extended or adjusted under 35 U.S.C. 154(b) by 425 days.

(21) Appl. No.: 16/328,865

(22) PCT Filed: Sep. 30, 2016

(86) PCT No.: PCT/CN2016/101096
§ 371 (c)(1),
(2) Date: Feb. 27, 2019

(87) PCT Pub. No.: WO2018/058533
PCT Pub. Date: Apr. 5, 2018

(65) Prior Publication Data
US 2021/0203740 A1 Jul. 1, 2021

(51) Int. Cl.
*H04L 67/568* (2022.01)
*H04L 49/90* (2022.01)
*G06F 9/455* (2018.01)

(52) U.S. Cl.
CPC ...... *H04L 67/2842* (2013.01); *G06F 9/45558* (2013.01); *H04L 49/90* (2013.01);
(Continued)

(58) Field of Classification Search
CPC combination set(s) only.
See application file for complete search history.

(56) References Cited

U.S. PATENT DOCUMENTS 7,434,002 B1   10/2008  Zedlewski et al.
9,817,786 B1 * 11/2017  Khan .................. G06F 13/4221
(Continued)

FOREIGN PATENT DOCUMENTS

CN          103036759 A      4/2013

OTHER PUBLICATIONS

PCT Search Report and Written Opinion prepared for PCT/CN2016/101096, completed Jul. 6, 2017.

*Primary Examiner* — Yee F Lam
(74) *Attorney, Agent, or Firm* — Hanley, Flight & Zimmerman, LLC (57) ABSTRACT

Technologies for managing paravirtual network device queue and memory of a network computing device that includes multi-core processor, a multi-layer cache, a host, and a plurality of virtual machine instances. The host is assigned a processor core of the processor and may be configured to copy a received network packet to a last level cache of the multi-layer cache and determine one or more virtual machine instances configured to process the received network packet. Each virtual machine instance has been assigned a processor core of the processor and has been allocated a first level cache of the multi-level cache memory associated with the respective processor core. The host is additionally configured to inject an interrupt into each processor core of the determined virtual machine (s) which indicates to the virtual machine instance (s) that the received network packet is available to be processed.

26 Claims, 5 Drawing Sheets

(52) U.S. Cl.
CPC .............. *G06F 2009/45583* (2013.01); *G06F 2009/45595* (2013.01)

(56) References Cited

U.S. PATENT DOCUMENTS

| | | |
|---|---|---|
| 2005/0076155 A1 | 4/2005 | Lowell |
| 2006/0200819 A1 | 9/2006 | Cherkasova et al. |
| 2010/0271381 A1* | 10/2010 | Byford .................. G09G 5/003 345/547 |
| 2012/0254896 A1 | 10/2012 | Aloni et al. |
| 2015/0161048 A1 | 6/2015 | Patil et al. |
| 2016/0092366 A1* | 3/2016 | Pal ...................... G06F 12/0831 711/125 |
| 2016/0117246 A1* | 4/2016 | Maurice ................ G06F 21/556 711/130 |
| 2016/0188474 A1* | 6/2016 | Wang .................. G06F 9/45558 711/119 |
| 2016/0371105 A1* | 12/2016 | Sieffert ............... G06F 9/45558 |
| 2017/0289068 A1* | 10/2017 | Palermo ................. H04L 49/70 |

\* cited by examiner

TECHNOLOGIES FOR PARAVIRTUAL NETWORK DEVICE QUEUE AND MEMORY MANAGEMENT

CROSS REFERENCE TO RELATED APPLICATIONS

The present application is a national stage entry under 35 USC § 371(b) of International Application No. PCT/CN2016/101096, filed Sep. 30, 2016.

BACKGROUND

Network operators and service providers typically rely on various network virtualization technologies to manage complex, large-scale computing environments, such as high-performance computing (HPC) and cloud computing environments. For example, network operators and service provider networks (e.g., internet service providers (ISPs), telecommunications service providers (TSPs), etc.) may rely on network function virtualization (NFV) deployments to deploy network services (e.g., firewall services, network address translation (NAT) services, load balancers, deep packet inspection (DPI) services, evolved packet core (EPC) services, mobility management entity (MME) services, packet data network gateway (PGW) services, serving gateway (SGW) services, billing services, transmission control protocol (TCP) optimization services, etc.). Such NFV deployments typically use an NFV infrastructure to orchestrate various virtual machines (VMs) to perform virtualized network services, commonly referred to as virtualized network functions (VNFs), on network traffic and to manage the network traffic across the various VMs.

Unlike traditional, non-virtualized deployments, virtualized deployments decouple network functions from underlying hardware, which results in network functions and services that are highly dynamic and generally capable of being executed on off-the-shelf servers with general purpose processors. As such, the VNFs can be scaled-in/out as necessary based on particular functions or network services to be performed on the network traffic. Accordingly, NFV deployments typically require greater performance and flexibility requirements while being expected to match the performance of non-virtualized appliances.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
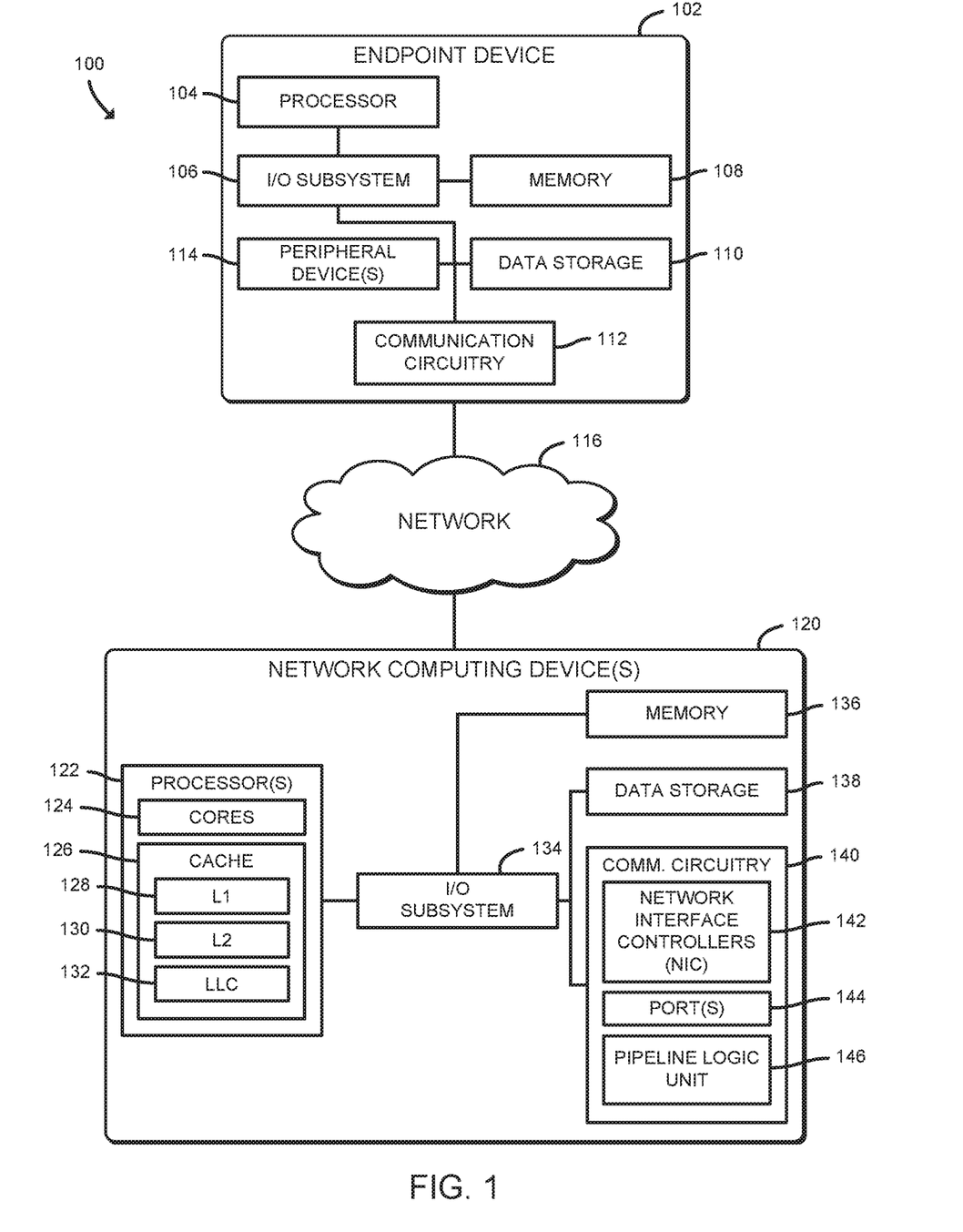
FIG. 1 is a simplified block diagram of at least one embodiment of a system for paravirtual network device queue and memory management that includes one or more network computing devices.

Referring now to FIG. 1, in an illustrative embodiment, a system 100 for paravirtual network device queue and memory management includes an endpoint device 102 in network communication with one or more network computing devices 120 via a network 116. In use, as will be discussed in further detail, the network computing device 120 may be configured to receive network packets and process the received network packets based on the data contained therein. For example, processing the received network packets may include performing a function, or service, thereon, such as firewall services, network address translation (NAT) services, load balancers, deep packet inspection (DPI) services, evolved packet core (EPC) services, mobility management entity (MME) services, packet data network gateway (POW) services, serving gateway (SOW) services, billing services, transmission control protocol (TCP) optimization services, etc. For example, the network computing device 120 may be configured to run the services via a number of virtual network functions (VNFs) using one or more virtual machines (VMs) (see, e.g., the VNFs 220 of the VMs 220 of FIG. 2), such as in a service function chain.

Unlike present technologies in which the guest system (e.g., the VMs) provides virtual device buffers, the network computing device 120 may be configured to allow the host system (e.g., the host operating system, the hypervisor, etc.) to provide the virtual device buffers. Accordingly, the network computing device 120 may be configured to manage shared memory buffers, and the queues thereof, for storing the received network packets (e.g., received via a port of a physical network interface controller (NIC)). Additionally, in some embodiments, the guest system (e.g., via a virtual CPU) copies network packet data stored in the buffers to copy the data into VM software stack (e.g., just in time), as opposed to the host processor core proactively performing the data copy. Accordingly, data from the network packets can be shared across virtual machine instances while shifting the burden of data moving towards the guest system(s).

In other words, unlike present paravirtual models in which the guest puts the Latest buffers onto the shared ring (i.e., post buffer allocation) and the host paravirtual backend driver copies memory from the host buffer to the guest buffer, the network computing device 120 as described in some embodiments herein is configured such that the host paravirtual backend driver places the host buffer onto the shared ring. As such, unlike the present paravirtual models in which the cache copy results in a cache transfer between the LLC and the guest processor core's L1 cache by way of the host processor core's L1 cache, the copy performed by the network computing device 120 as described in some embodiments herein does not result in a cache transfer by the host paravirtual backend driver at all, but rather the guest driver copies directly from the LLC (i.e., the host buffer) to the to the guest processor core's L1 cache (i.e., the guest buffer). It should be appreciated that, due to cache coherency protocol, the copy can be much faster from LLC to the host processor core's L1 cache as opposed to the copy being made from the guest processor core's L1 cache to the host processor core's L1 cache as exists in present paravirtual models, which can additionally save CPU cycles, as well.

The endpoint device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 1, the illustrative endpoint device includes a processor 104, an input/output (I/O) subsystem 106, a memory 108, a data storage device 110, communication circuitry 112, and one or more peripheral devices 114. Of course, in other embodiments, the endpoint device 102 may include alternative or additional components, such as those commonly found in a computing device capable of communicating with a telecommunications infrastructure (e.g., various input/output devices). Additionally, in some embodiments, one or more of the illustrative components may be incorporated in, or otherwise form a portion of, another component. For example, the memory 108, or portions thereof, may be incorporated into the processor 104, in some embodiments. Further, in some embodiments, one or more of the illustrative components may be omitted from the endpoint device 102.

The processor 104 may be embodied as any type of processor capable of performing the functions described herein. For example, the processor 104 may be embodied as one or more single core processors, on or more multi-core processors, a digital signal processor, a microcontroller, or other processor or processing/controlling circuit. Similarly, the memory 108 may be embodied as any type of volatile or non-volatile memory or data storage capable of performing the functions described herein. In operation, the memory 108 may store various data and software used during operation of the endpoint device 102, such as operating systems, applications, programs, libraries, and drivers.

The memory 108 is communicatively coupled to the processor 104 via the I/O subsystem 106, which may be embodied as circuitry and/or components to facilitate input/output operations with the processor 104, the memory 108, and other components of the endpoint device 102. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 104, the memory 108, and other components of the endpoint device 102, on a single integrated circuit chip.

The data storage device 110 may be embodied as any type of device or devices configured for short-term or long-term storage of data such as, for example, memory devices and circuits, memory cards, hard disk drives, solid-state drives, or other data storage devices. It should be appreciated that the data storage device 110 and/or the memory 108 (e.g., the computer-readable storage media) may store various data as described herein, including operating systems, applications, programs, libraries, drivers, instructions, etc., capable of being executed by a processor (e.g., the processor 104) of the endpoint device 102.

The communication circuitry 112 may be embodied as any communication circuit, device, or collection thereof, capable of enabling communications between the endpoint device 102 and other computing devices, such as the network computing devices 120, as well as any network communication enabling devices, such as an access point, network switch/router, etc., to allow communication over the network 116. The communication circuitry 112 may be configured to use any one or more communication technologies (e.g., wireless or wired communication technologies) and associated protocols (e.g., Ethernet, Bluetooth®, WiMAX, LTE, 5G, etc.) to effect such communication.

The network 116 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 116 may serve as a centralized network and, in some embodiments, may be communicatively coupled to another network (e.g., the Internet). Accordingly, the network 116 may include a variety of other virtual and/or physical network computing devices (e.g., routers, switches, network hubs, servers, storage devices, compute devices, etc.), as needed to facilitate communication between the endpoint device 102 and the network computing device(s) 120, which are not shown to preserve clarity of the description.

The network computing device 120 may be embodied as any type of network traffic managing, processing, and/or forwarding device, such as a server (e.g., stand-alone, rack-mounted, blade, etc.), an enhanced network interface controller (NIC) (e.g., a host fabric interface (HR)), a network appliance (e.g., physical or virtual), switch (e.g., a disaggregated switch, a rack-mounted switch, a standalone switch, a fully managed switch, a partially managed switch, a full-duplex switch, and/or a half-duplex communication mode enabled switch), a router, a web appliance, a distributed computing system, a processor-based system, and/or a multiprocessor system. It should be appreciated that while the illustrative system 100 includes only includes a single network computing device 120, there may be any number of additional network computing devices 120, as well any number of additional endpoint devices 102, in other embodiments.

As shown in FIG. 1, similar to the previously described endpoint device 102, the illustrative network computing device 120 includes one or more processors 122, an I/O subsystem 134, a memory 136, a data storage device 138, and communication circuitry 140. As such, further descriptions of the like components are not repeated herein for clarity of the description with the understanding that the description of the corresponding components provided above in regard to the endpoint device 102 applies equally to the corresponding components of the network computing device 120. Of course, in other embodiments, the network computing device 120 may include additional or alternative components, such as those commonly found in a server, router, switch, or other network device. Additionally, in some embodiments, one or more of the illustrative components may be incorporated in, or otherwise form a portion of, another component.

The illustrative processor 122 includes more than one processor cores 124, each embodied as an independent logical execution unit capable of executing programmed instructions. In other words, the processor 122 is a multi-core processor. It should be appreciated that, in some embodiments of the network computing device 120 (e.g., a supercomputer), the network computing device 120 may include thousands of processor cores 124. It should be further appreciated that, in some embodiments, each processor 122 may be connected to a physical connector, or socket, on a motherboard (not shown) of the network computing device 120 configured to accept a single physical processor package (i.e., a multi-core physical integrated circuit). In some embodiments, the network computing device 120 may include more than one physical processor package, each of which may be connected to the motherboard of the network computing device 120 via an individual socket coupled to one or more independent hardware memory slots.

The illustrative processor 122 additionally includes a cache memory 126, which may be embodied as any type of cache that the processor 122 can access more quickly than the memory 136 (i.e., main memory), such as an on-die cache, or on-processor cache. In other embodiments, the cache memory 126 may be an off-die cache, but reside on the same system-on-a-chip (SoC) as the processor 122. The illustrative cache memory 126 includes a multi-level cache architecture embodied as a level 1 cache designated as L1 cache 128, a level 2 cache designated as L2 cache 130, and a last level cache designated as LLC 132. It should be appreciated that, in some embodiments, the multi-level cache architecture may include additional and/or alternative levels of cache memory.

The illustrative communication circuitry 140 of the network computing device 120 includes more than one network interface controller (NIC) 142, one or more ingress/egress ports 144, and a pipeline logic unit 146. The NIC 142 may be embodied as one or more add-in-boards, daughtercards, network interface cards, controller chips, chipsets, or other devices that may be used by the network computing device 120. For example, in some embodiments, the NIC 142 may be integrated with the processor 122, embodied as an expansion card coupled to the I/O subsystem 134 over an expansion bus (e.g., PCI Express), part of a SoC that includes one or more processors, or included on a multichip package that also contains one or more processors. Additionally or alternatively, in some embodiments, functionality of the NIC 142 may be integrated into one or more components of the network computing device 120 at the board level, socket level, chip level, and/or other levels. In some embodiments, the NIC 142 may be configured to facilitate the transfer of data/messages to enable tasks executing on the processors 122 to access shared structures (e.g., shared physical memory) of the other network computing devices 120, such as may be necessary during parallel or distributed computing operations. It should be appreciated that, in some embodiments, the NIC 142 may be embodied as an enhanced NIC, or host fabric interface (HFI)).

The one or more ingress/egress ports 144 (i.e., input/output ports) may be embodied as any type of network port capable of transmitting/receiving network traffic to/from the network computing device 120. Accordingly, in some embodiments, the network computing device 120 may be configured to create a separate collision domain for each of the ingress/egress ports 144. As such, depending on the network design of the network computing device 120 and the operation mode (e.g., half-duplex, full-duplex, etc.), it should be appreciated that each of the other network computing devices 120 connected to one of the ingress/egress ports 144 (e.g., via an interconnect) may be configured to transfer data to any of the other network computing devices 120 at any given time, and the transmissions should not interfere, or collide.

The pipeline logic unit 146 may be embodied as any specialized device, circuitry, hardware, or combination thereof to perform pipeline logic (e.g., hardware algorithms) for performing the functions described herein. In some embodiments, the pipeline logic unit 146 may be embodied as a system-on-a-chip (SoC) or otherwise form a portion of a SoC of the network computing device 120 (e.g., incorporated, along with the processor 122, the memory 138, the communication circuitry 140, and/or other components of the network computing device 120, on a single integrated circuit chip). Alternatively, in some embodiments, the pipeline logic unit 146 may be embodied as one or more discrete processing units of the network computing device 120, each of which may be capable of performing one or more of the functions described herein. For example, the pipeline logic unit 146 may be configured to process network packets (e.g., parse received network packets, determine destination computing devices for each received network packets, forward the network packets to a particular buffer queue of a respective host buffer of the network computing device 120, etc.), perform computational functions, etc.

Figure 2:
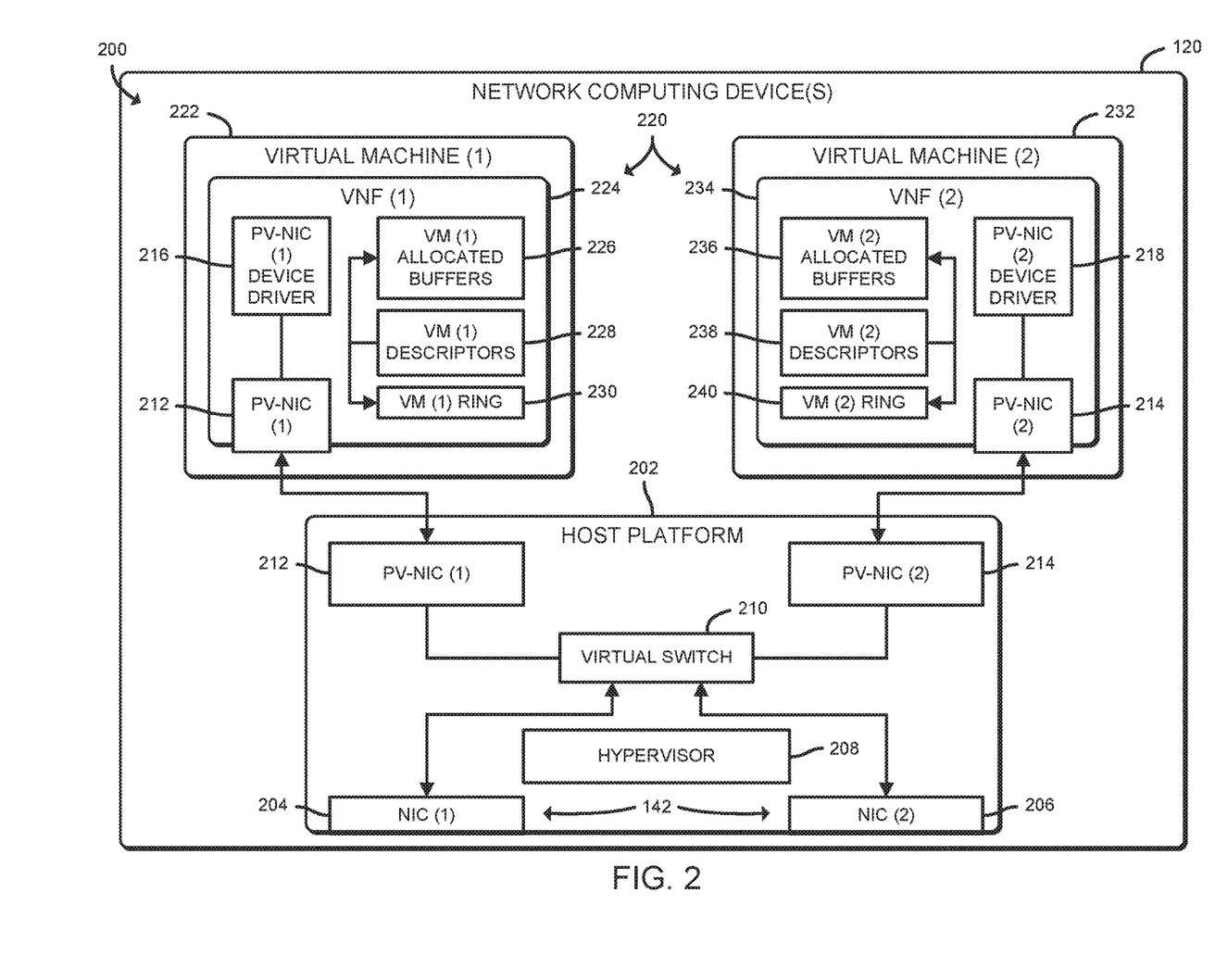
FIG. 2 is a simplified block diagram of at least one embodiment of a paravirtual network device architecture of the network computing device of the system of FIG. 1.

Referring now to FIG. 2, in an illustrative embodiment, a paravirtual network device architecture 200 of the network computing device 120 includes a host platform 202 and virtual machines (VMs) 220. The illustrative host platform 202 includes a first NIC 142, which is designated as NIC (1) 204 and a second NIC 142, which is designated as NIC (2) 206; however, it should be appreciated that, in other embodiments, one or more additional NICs 142 may be present. Each of the physical NICs 204, 206 are communicatively coupled to a virtual switch 210 of the host platform 202, which is communicatively coupled to two or more paravirtual NICs. It should be appreciated that, in some embodiments, a single physical NIC may include more than one port, such that each port is connected to the virtual switch 210.

The illustrative paravirtual NICs include a first paravirtual NIC, which is designated as PV-NIC (1) 212 and a second paravirtual NIC, which is designated as PV-NIC (2) 214. The illustrative host platform 202 additionally includes a hypervisor 208 and a virtual switch 210. The hypervisor 208 (e.g., a paravirtualization hypervisor) may be configured to control access to hardware resources of the network computing device 120 (e.g., the processor(s) 122, the memory 136, etc.). Accordingly, accesses to hardware resources of the network computing device 120 may be coordinated by the hypervisor 208 between the hardware resources of the host platform 202 and VMs 220 (e.g., a privileged guest operating system). It should be appreciated that such configuration may require modifications residing in the kernel of the network computing device 120, which occur prior to execution. The virtual switch 210 may be configured to manage the internal data transfer of network traffic and/or information related thereto between the physical NICs 142 of the host platform 202 (e.g., physical NICs 204, 206) and the paravirtual NICs (e.g., PV-NIC (1) 212 and PV-NIC (2) 214).

The illustrative VM (1) 222 includes device driver associated with the paravirtual NIC 212, designated as PV-NIC (1) device driver 216, as well as allocated buffers, descriptors, and a descriptor ring designated as VM (1) allocated buffers 226, VM (l) descriptors 228, and VM(1) ring 230, respectively. Similarly, the illustrative VM (2) 232 includes device driver associated with the paravirtual NIC 214, designated as PV-NIC (1) device driver 218, as well as allocated buffers, descriptors, and a descriptor ring designated as VM (2) allocated buffers 236, VM (2) descriptors 238, and VM (2) ring 240, respectively.

As shown in FIG. 2, each of the PV-NICs 212, 214 extend between the host platform 202 and the respective VMs 220. It should be appreciated that such extension is a representation of a front-end driver and a backend driver, commonly referred to as stub drivers, between which communication occurs. Accordingly, the PV-NICs 212, 214 can make communicative calls between the actual device driver (e.g., one of the paravirtual NIC device drivers 216, 218) and the corresponding paravirtual NIC (e.g., a corresponding one of the PV-NICs 212, 214) that appears as a typical device driver making a hardware call. The illustrative VMs 220 include a first VM, which is designated as VM (1) 222 and a second VM, which is designated as VM (2) 232; however, it should be appreciated that, in other embodiments, additional and/or alternative VMs may be instantiated.

Figure 3:
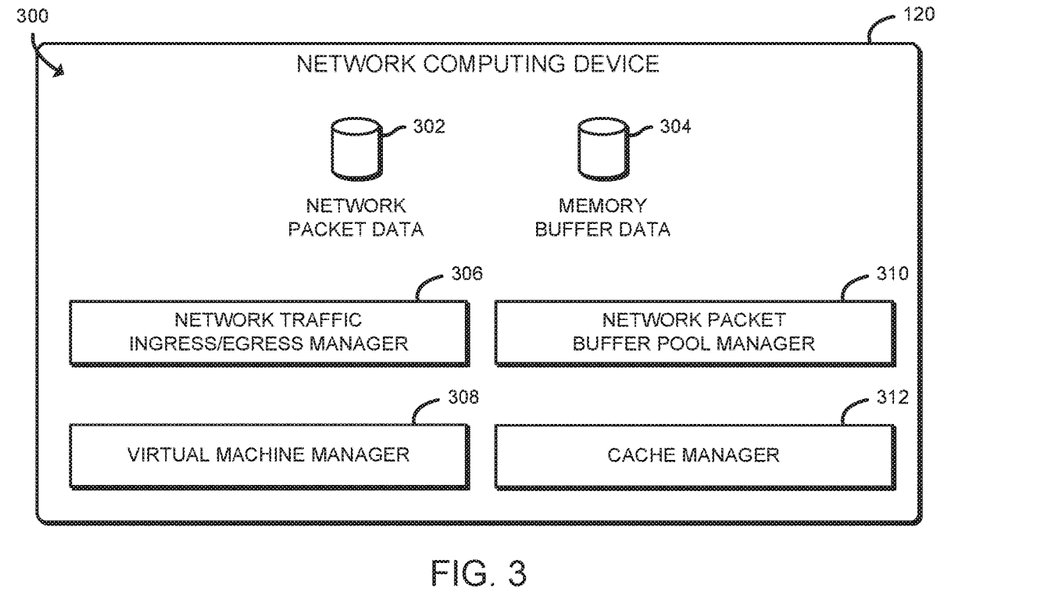
FIG. 3 is a simplified block diagram of at least one embodiment of an environment of the network computing device of the system of FIG. 1.

Referring now to FIG. 3, in use, the network computing device 120 establishes an environment 300 during operation. The illustrative environment 300 includes a network traffic ingress/egress manager 306, a virtual machine manager 308, a network packet buffer pool manager 310, and a cache manager 312. The various components of the environment 300 may be embodied as hardware, firmware, software, or a combination thereof. As such, in some embodiments, one or more of the components of the environment 300 may be embodied as circuitry or collection of electrical devices (e.g., a network traffic ingress/egress managing circuit 306, a virtual machine managing circuit 308, a network packet buffer pool managing circuit 310, a cache managing circuit 312, etc.).

It should be appreciated that, in such embodiments, one or more of the network traffic ingress/egress managing circuit 306, the virtual machine managing circuit 308, the network packet buffer pool managing circuit 310, and the cache managing circuit 312 may form a portion of one or more of the processor 122, the I/O subsystem 134, the communication circuitry 140, and/or other components of the network computing device 120. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 122 or other components of the network computing device 120. It should be appreciated that the network computing device 120 may include other components, sub-components, modules, sub-modules, logic, sub-logic, and/or devices commonly found in a computing device, which are not illustrated in FIG. 4 for clarity of the description.

In the illustrative environment 300, the network computing device 120 additionally includes network packet data 302 and memory buffer data 304, each of which may be accessed by the various components and/or sub-components of the network computing device 120. Further, each of the network packet data 302 and the memory buffer data 304 may be accessed by the various components of the network computing device 120. Additionally, it should be appreciated that in some embodiments the data stored in, or otherwise represented by, each of the network packet data 302 and the memory buffer data 304 may not be mutually exclusive relative to each other. For example, in some implementations, data stored in the network packet data 302 may also be stored as a portion of the memory buffer data 304, or vice versa. As such, although the various data utilized by the network computing device 120 is described herein as particular discrete data, such data may be combined, aggregated, and/or otherwise form portions of a single or multiple data sets, including duplicative copies, in other embodiments.

The network traffic ingress/egress manager 306, which may be embodied as hardware, firmware, software, virtualized hardware, emulated architecture, and/or a combination thereof as discussed above, may be configured to receive/transmit network traffic to/from external computing devices (e.g., the endpoint device 102 and/or other network computing device(s) 120 communicatively coupled to the network computing device 120). In other words, the network traffic ingress/egress manager 306 may be configured to facilitate inbound and outbound network communications (e.g., network traffic, network packets, network flows, etc.) to and from the network computing device 120. To do so, the network traffic ingress/egress manager 306 may be configured to manage (e.g., create, modify, delete, etc.) connections to physical and virtual network ports (i.e., virtual network interfaces) of the network computing device 120 (e.g., via the communication circuitry 140), as well as the ingress and egress buffers/queues associated with the network ports. In some embodiments, network traffic information (e.g., workload types, paths, destination computing device information, flows, etc.) may be stored in the network packet data 302.

The virtual machine manager 308, which may be embodied as hardware, firmware, software, virtualized hardware, emulated architecture, and/or a combination thereof as discussed above, may be configured to manage the VMs of the network computing device 120 (e.g., the VMs 220 of FIG. 2), as well as each of the VNFs associated therewith (e.g., VNF(1) 224 of VM (1) 222 and VNF (2) 234 of VM (2) 232 of FIG. 2). To do so, the virtual machine manager 308 may be configured to deploy (i.e., spin-up, instantiate, provision, etc.) and close (i.e., wind-down, shut-down, remove, etc.) the VMs based on the various functions of the VMs, such as may be used to process network traffic. Accordingly, in some embodiments, the virtual machine manager 308 may be additionally configured to manage any drivers associated with the respective VMs (e.g., VNF drivers). It should be appreciated that, in some embodiments, the virtual machine manager 308 may be additionally configured to determine, or otherwise monitor, available resources of the network computing device 120. For example, the resources may include available network resources (e.g., available bandwidth, available connections to other network computing device 120, queue congestion, latency, telemetry data, etc.) and/or available system resources (e.g., available memory, available processor cores, types of installed software, I/O capabilities, queue congestion, etc.).

The network packet buffer pool manager 310, which may be embodied as hardware, firmware, software, virtualized hardware, emulated architecture, and/or a combination thereof as discussed above, may be configured to coordinate the allocation of buffer memory to hold received network packets, as well as place descriptors that point to the buffers into a descriptor ring. In other words, the network packet buffer pool manager 310 may be configured to allocate queue/buffer descriptor rings, in which each descriptor indicates a location in host memory the buffer resides, as well as the size of the buffer. In some embodiments, such descriptors may be stored in the memory buffer data.

The cache manager 312, which may be embodied as hardware, firmware, software, virtualized hardware, emulated architecture, and/or a combination thereof as discussed above, may be configured to manage the allocation and designation of cache memory of the network computing device, such as the cache memory 126 of FIG. 1. To do so, the cache manager 312 may be configured to manage the allocation of cache memory into cache blocks, as well as the mapping of the cache blocks to portions of physical memory (e.g., the main memory 136 of FIG. 1) of the network computing device 120. Additionally, the cache manager 312 may be configured to manage the accesses (e.g., read, writes, etc.) to cache memory. In other words, the cache manager 312 may be configured to manage the flow of data to and from the cache memory of the network computing device 120. The cache manager 312 may be further configured to manage eviction of data from cache lines of the cache memory 126. To do so, the cache manager 312 may be configured to enforce cache eviction policies (i.e., cache replacement algorithms/policies). It should be appreciated that more than one cache eviction policy may be enforced for any given cache line. For example, the cache eviction policies may include a least recently used (LRU), a most recently used (MRU), etc.

Figure 4:
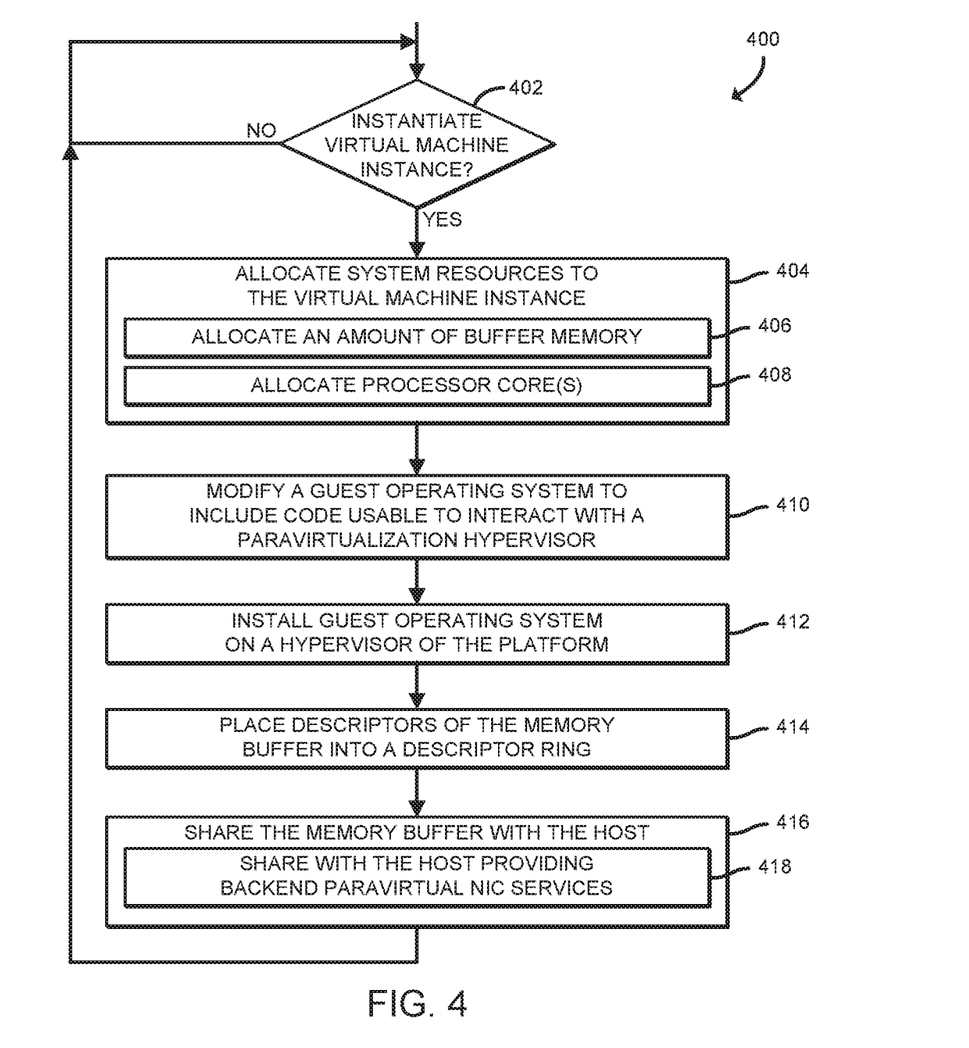
FIG. 4 is a simplified flow diagram of at least one embodiment of a method for instantiating a virtual machine instance that may be executed by the network computing device of FIGS. 2 and 3.

Referring now to FIG. 4, the network computing device 120 may execute method 400 for instantiating a VM instance (see, e.g., the VM instances VM (1) 222 and VM (2) 232 of FIG. 2). The method 400 beings with block 402, in which the network computing device 120 determines whether to instantiate a VM instance. If so, the method 400 advances to block 404, in which the network computing device 120 allocates certain system resources of the network computing device 120 to the VM instance to be instantiated. For example, in block 406, the network computing device 120 allocates an amount of memory to a buffer memory of the VM instance. Additionally, in block 408, the network computing device 120 allocates, or assigns, one or more processor cores (e.g., one or more of the processor cores 124 of the network computing device 120 of FIG. 1) to the VM instance.

In block 410, the network computing device 120 modifies a guest operating system to include code usable to interact with a paravirtualization hypervisor (see, e.g., the hypervisor 208 of FIG. 2). It should be appreciated that the driver for the paravirtual NIC may be packed with the guest operating system binary. In block 412, the network computing device 120 assigns the allocated system resources (e.g., a memory buffer usable to store received network packets). In block 414, the network computing device 120 places descriptors of the memory buffer into a descriptor ring (e.g., a software-based descriptor ring). In block 416, the network computing device 120 shares the memory buffer with the host. To do so, in block 418, the network computing device 120 shares the memory buffer with the host providing the backend paravirtual NIC services.

Figure 5:
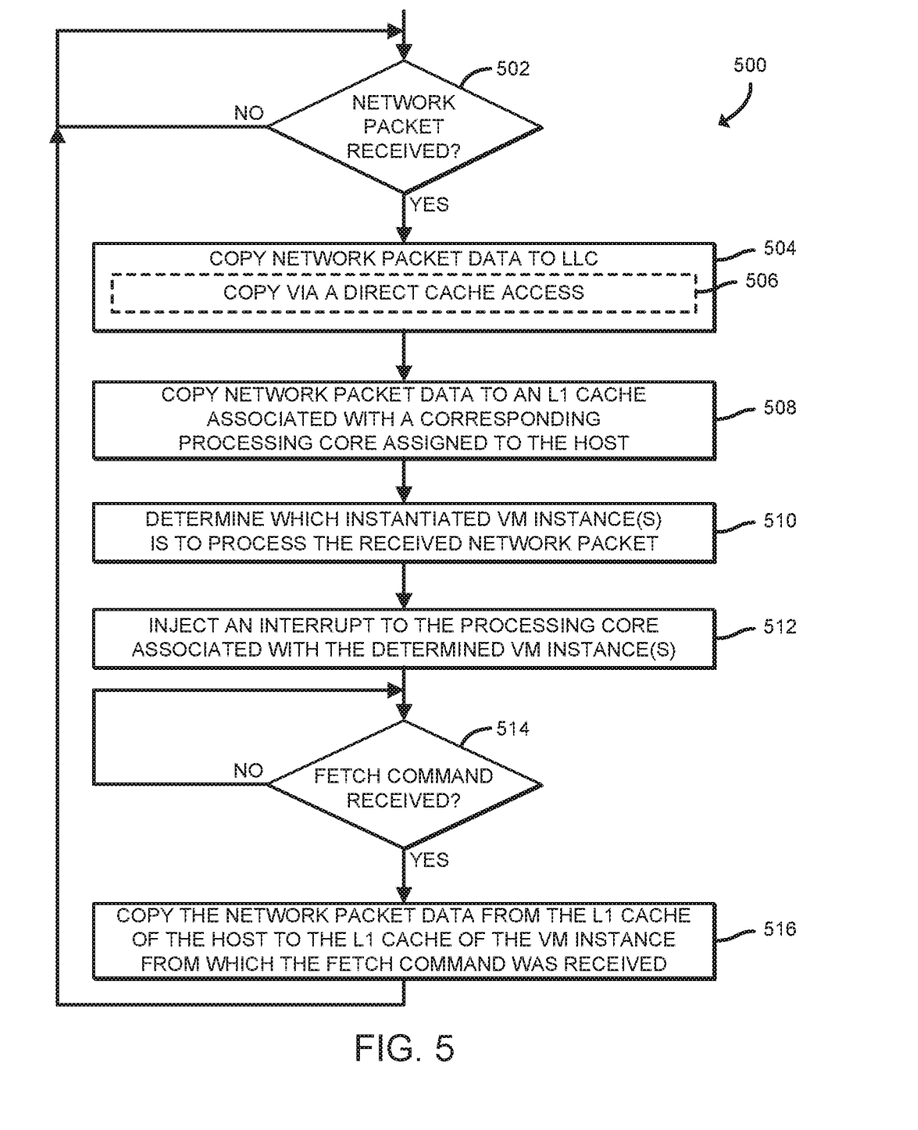
FIG. 5 is a simplified flow diagram of at least one embodiment of a method for processing a received network packet that may be executed by the network computing device of FIGS. 2 and 3.

Referring now to FIG. 5, the network computing device 120 may execute a method 500 for processing a received network packet. The method 500 begins with block 502, in which the network computing device 120 determines whether a network packet has been received. If so, the method 500 advances to block 504, in which the network computing device 120 copies, via direct memory access (DMA), the network packet data to the LLC (e.g., the LLC 132) of the network computing device 120, as opposed to main memory (e.g., the memory 136). For example, in some embodiments, in block 506, the network computing device 120 DMA copies network packet data to the LLC associated with the host buffer memory assigned for DMA. It should be appreciated that the LLC is shared between the processor cores of the corresponding processor.

In some embodiments, in block 508, the network computing device 120 copies at least a portion of the network packet (e.g., a portion of the network packet header) to an L1 cache (e.g., the L1 cache 128) associated with a corresponding processor core (e.g., one or more of the processor cores 124) previously assigned to the host (see, e.g., the host platform 202 of FIG. 2). It should be appreciated that one or more processor cores has been previously assigned to the host, or otherwise designated as usable by the host exclusively. It should be further appreciated that each VM instantiated by the network computing device 120 has been assigned one or more processor cores upon instantiation and that each of the one or more processor cores has a designated L1 cache (e.g., the L1 cache 128) and a designated L2 cache (e.g., the L2 cache 130).

In block 510, the network computing device 120 determines which of the one or more presently instantiated VM instances are to process the received network packet. As described previously, a VM instance may be instantiated to perform a particular function, or service. For example, in some embodiments, a series of such services may be formed in a service function chain (SFC). In such embodiments, more than one presently instantiated VM instance may be identified to process the received network packet. In block 512, the network computing device 120 injects an interrupt to a respective processing core associated with the determined VM instances.

In block 514, the network computing device 120 determines whether a fetch command has been received from one of the respective processing cores to which the interrupt was injected in block 512. It should be appreciated that block 514 is a non-blocking function. In other words, in some embodiments, the completion of the method 500 may not be dependent on having received the fetch command. If the network computing device 120 determines a fetch command has been received, the method 500 advances to block 516. In block 516, the network computing device 120 copies the network packet data from the LLC, a host buffer, to the L1 cache of the processor core, a guest buffer, associated with the VM instance from which the fetch command was received. In other words, the actions performed in blocks 514 and 516 (i.e., the copying the network packet data to the guest VM) are initiated by the paravirtual NIC driver, thereby keeping the first and second level cache (i.e., L1 and L2 cache) of the host platform clean to allow the processor core of the VM to retrieve the data directly from LLC.

In some embodiments, the copy described in block 516 may be performed as a copy into a software stack of the respective VM just-in-time, as opposed to present technologies in which the host processor core proactively performs the copy. Accordingly, the processor cycle burden of moving data is shifted from the host to the VMs, which may improve system scalability. In other words, while the total number of processor cycles (i.e., central processing unit (CPU) cycles) needed to support a certain amount of cumulative received network traffic per second in the host platform, the copying workload as described herein is distributed among the available processor cores associated with the VMs. As such, the need to over-provision from the host infrastructure administration perspective can be mitigated.

It should be appreciated that processing the received network packets may further include determining a destination computing device (e.g., the endpoint device 102, another network computing device 120, etc.) usable to forward the received network packet based on data associated with the network packet, such as a workload or data type associated with the network packet(s), a destination address (e.g., an internet protocol (IP) address, a destination media access control (MAC) address, etc.) of a destination computing device, a 5-tuple flow identification, etc.

It should be appreciated that, in some embodiments, at least a portion of the methods 400 and 500 may be embodied as various instructions stored on a computer-readable media, which may be executed by a processor (e.g., the processor 122), the communication circuitry 140, and/or other components of the network computing device 120 to cause the network computing device 120 to perform at least a portion of the methods 400 and 500. The computer-readable media may be embodied as any type of media capable of being read by the network computing device 120 including, but not limited to, the memory 136, the data storage device 138, other memory or data storage devices of the network computing device 120, portable media readable by a peripheral device of the network computing device 120, and/or other media.

EXAMPLES

Illustrative examples of the technologies disclosed herein are provided below. An embodiment of the technologies may include any one or more, and any combination of, the examples described below.

Example 1 includes a network computing device for managing paravirtual network device queues and memory of the network computing device, the network computing device comprising a network traffic ingress/egress manager to copy at least a portion of a network packet received by the network computing device to a last level cache of a multi-level cache memory allocated to a processor of the network computing device, wherein the processor includes a plurality of processor cores, wherein one of the processor cores has been assigned to a host of the network computing device, wherein one or more of the other processor cores have each been assigned to a corresponding virtual machine instance of a plurality of virtual machine instances presently executing on the network computing device, and wherein the multi-level cache memory includes a first level of the multi-level cache memory allocated to the processor core assigned to the host; and determine, by the host, a virtual machine instance of the plurality of virtual machine instances is to process the portion of the received network packet, wherein the multi-level cache memory additionally includes a first level of the multi-level cache memory allocated to a corresponding processor core of the determined virtual machine instance; and a cache manager to copy the portion of the received network packet from the last level cache to the first level cache allocated to the corresponding processor core assigned to the determined virtual machine instance.

Example 2 includes the subject matter of Example 1, and wherein the host comprises one of a host operating system or a host hypervisor.

Example 3 includes the subject matter of any of Examples 1 and 2, and wherein the last level cache comprises a portion of the multi-level cache memory shared between the host and the virtual machine instance.

Example 4 includes the subject matter of any of Examples 1-3, and further including a network traffic ingress/egress manager to inject, by the host and subsequent to having determined the virtual machine instance, an interrupt into the processor core assigned the determined virtual machine instance, wherein the interrupt indicates to the virtual machine instance that the received network packet is available to be processed.

Example 5 includes the subject matter of any of Examples 1-4, and wherein the plurality of instructions further cause the network computing device to determine, by the host and subsequent to having injected the interrupt, whether a fetch command has been received from the determined virtual machine instance, wherein the copy of the portion of the received network packet is performed in response to having received the fetch command.

Example 6 includes the subject matter of any of Examples 1-5, and wherein to copy the received portion of the network packet to the last level cache comprises to copy the portion of the received network packet to a descriptor ring, wherein the descriptor ring is shared between the each of the plurality of processor cores.

Example 7 includes the subject matter of any of Examples 1-6, and wherein the plurality of instructions further cause the network computing device to allocate, prior to instantiation of the virtual machine instance, one or more system resources to the virtual machine instance to be instantiated; modify a guest operating system to include code usable to interact with a paravirtualization hypervisor of the host; install the modified guest operating system onto the paravirtualization hypervisor; place a plurality of descriptors of the memory buffer into a descriptor ring, wherein each of the descriptors indicates a location in memory allocated to the host in which the memory buffer resides; and share the memory buffer between the host and the virtual machine instance.

Example 8 includes the subject matter of any of Examples 1-7, and wherein to allocate the one or more system resources comprises to allocate an amount of buffer memory and at least one of the processor cores.

Example 9 includes a method for managing paravirtual network device queues and memory of a network computing device, the method comprising copying, by a host of the network computing device, at least a portion of a network packet received by the network computing device to a last level cache of a multi-level cache memory allocated to a processor of the network computing device, wherein the processor includes a plurality of processor cores, wherein one of the processor cores has been assigned to the host, wherein one or more of the other processor cores have each been assigned to a corresponding virtual machine instance of a plurality of virtual machine instances presently executing on the network computing device, and wherein the multi-level cache memory includes a first level of the multi-level cache memory allocated to the processor core assigned to the host; and determining, by the host, a virtual machine instance of the plurality of virtual machine instances is to process the portion of the received network packet, wherein the multi-level cache memory additionally includes a first level of the multi-level cache memory allocated to a corresponding processor core of the determined virtual machine instance; and copying, by the host, the portion of the received network packet from the last level cache to the first level cache allocated to the corresponding processor core assigned to the determined virtual machine instance.

Example 10 includes the subject matter of Example 9, and wherein the copying by the host comprises copying by one of a host operating system or a host hypervisor.

Example 11 includes the subject matter of any of Examples 9 and 10, and wherein the copying to the last level cache comprises copying to a portion of the multi-level cache memory shared between the host and the virtual machine instance.

Example 12 includes the subject matter of any of Examples 9-11, and further including injecting, by the host and subsequent to having determined the virtual machine instance, an interrupt into the processor core assigned the determined virtual machine instance, wherein the interrupt indicates to the virtual machine instance that the received network packet is available to be processed.

Example 13 includes the subject matter of any of Examples 9-12, and further including determining, by the host and subsequent to having injected the interrupt, whether a fetch command has been received from the determined virtual machine instance, wherein the copying of the portion of the received network packet is performed in response to having received the fetch command.

Example 14 includes the subject matter of any of Examples 9-13, and wherein copying the received portion of the network packet to the last level cache comprises copying the portion of the received network packet to a descriptor ring, wherein the descriptor ring is shared between the each of the plurality of processor cores.

Example 15 includes the subject matter of any of Examples 9-14, and further including allocating, by the host and prior to instantiation of the virtual machine instance, one or more system resources to the virtual machine instance to be instantiated; modifying, by the host, a guest operating system to include code usable to interact with a paravirtualization hypervisor of the host; installing, by the host, the modified guest operating system onto the paravirtualization hypervisor; placing, by the host, a plurality of descriptors of the memory buffer into a descriptor ring, wherein each of the descriptors indicates a location in memory allocated to the host in which the memory buffer resides; and sharing, by the host, the memory buffer between the host and the virtual machine instance.

Example 16 includes the subject matter of any of Examples 9-15, and wherein allocating the ne or more system resources comprises allocating an amount of buffer memory and at least one of the processor cores.

Example 17 includes a network computing device comprising a processor; and a memory having stored therein a plurality of instructions that when executed by the processor cause the network computing device to perform the method of any of Examples 9-16.

Example 18 includes one or more machine readable storage media comprising a plurality of instructions stored thereon that in response to being executed result in a network computing device performing the method of any of Examples 9-16.

Example 19 includes a network computing device for managing paravirtual network device queues and memory of the network computing device, the network computing device comprising means for copying at least a portion of a network packet received by the network computing device to a last level cache of a multi-level cache memory allocated to a processor of the network computing device, wherein the processor includes a plurality of processor cores, wherein one of the processor cores has been assigned to a host of the network computing device, wherein one or more of the other processor cores have each been assigned to a corresponding virtual machine instance of a plurality of virtual machine instances presently executing on the network computing device, and wherein the multi-level cache memory includes a first level of the multi-level cache memory allocated to the processor core assigned to the host; and means for determining a virtual machine instance of the plurality of virtual machine instances is to process the portion of the received network packet, wherein the multi-level cache memory additionally includes a first level of the multi-level cache memory allocated to a corresponding processor core of the determined virtual machine instance; and means for copying the portion of the received network packet from the last level cache to the first level cache allocated to the corresponding processor core assigned to the determined virtual machine instance.

Example 20 includes the subject matter of Example 19, and wherein the means for copying by the host comprises means for copying by one of a host operating system or a host hypervisor.

Example 21 includes the subject matter of any of Examples 19 and 20, and wherein the means for copying to the last level cache comprises means for copying to a portion of the multi-level cache memory shared between the host and the virtual machine instance.

Example 22 includes the subject matter of any of Examples 19-21, and further including means for injecting, by the host and subsequent to having determined the virtual machine instance, an interrupt into the processor core assigned the determined virtual machine instance, wherein the interrupt indicates to the virtual machine instance that the received network packet is available to be processed.

Example 23 includes the subject matter of any of Examples 19-22, and further including means for determining, subsequent to having injected the interrupt, whether a fetch command has been received from the determined virtual machine instance, wherein the copying of the portion of the received network packet is performed in response to having received the fetch command.

Example 24 includes the subject matter of any of Examples 19-23, and wherein the means for copying the received portion of the network packet to the last level cache comprises means for copying the portion of the received network packet to a descriptor ring, wherein the descriptor ring is shared between the each of the plurality of processor cores.

Example 25 includes the subject matter of any of Examples 19-24, and further including means for allocating, prior to instantiation of the virtual machine instance, one or more system resources to the virtual machine instance to be instantiated; means for modifying a guest operating system to include code usable to interact with a paravirtualization hypervisor of the host; means for installing the modified guest operating system onto the paravirtualization hypervisor; means for placing a plurality of descriptors of the memory buffer into a descriptor ring, wherein each of the descriptors indicates a location in memory allocated to the host in which the memory buffer resides; and means for sharing the memory buffer between the host and the virtual machine instance.

Example 26 includes the subject matter of any of Examples 19-25, and wherein the means for allocating the one or more system resources comprises means for allocating an amount of buffer memory and at least one of the processor cores.

The invention claimed is:

1. A network computing device to manage paravirtual network device queues and memory of the network computing device, the network computing device comprising:
   network traffic ingress/egress manager circuitry to:
      copy at least a portion of a network packet received by the network computing device to a last level cache of a multi-level cache memory allocated to a processor of the network computing device, the processor including a plurality of processor cores, one of the processor cores assigned to a host of the network computing device, one or more of the other processor cores assigned to a corresponding virtual machine instance of a plurality of virtual machine instances executing on the network computing device;
      determine a first virtual machine instance of the plurality of virtual machine instances that is to process the portion of the network packet, the multi-level cache memory including a first level cache of the multi-level cache memory allocated to a corresponding processor core of the first virtual machine instance; and
      inject, subsequent to having determined the first virtual machine instance, an interrupt into the processor core assigned the first virtual machine instance, the interrupt to indicate to the first virtual machine instance that the network packet is available to be processed; and
   cache manager circuitry to copy the portion of the network packet from the last level cache to the first level cache allocated to the corresponding processor core assigned to the first virtual machine instance.

2. The network computing device of claim 1, wherein the host includes one of a host operating system or a host hypervisor.

3. The network computing device of claim 1, wherein the last level cache includes a portion of the multi-level cache memory shared between the host and the first virtual machine instance.

4. The network computing device of claim 1, wherein the cache manager circuitry is to copy the portion of the network packet in response to a fetch command.

5. The network computing device of claim 1, wherein the cache manager circuitry is to copy the portion of the network packet to a descriptor ring, the descriptor ring shared between ones of the plurality of processor cores.

6. A network computing device to manage paravirtual network device queues and memory of the network computing device, the network computing device comprising:
   network traffic ingress/egress manager circuitry to:
      copy at least a portion of a network packet received by the network computing device to a last level cache of a multi-level cache memory allocated to a processor of the network computing device, the processor including a plurality of processor cores, one of the processor cores assigned to a host of the network computing device, one or more of the other processor cores assigned to a corresponding virtual machine instance of a plurality of virtual machine instances executing on the network computing device; and
      determine a first virtual machine instance of the plurality of virtual machine instances that is to process the portion of the network packet, the multi-level cache memory including a first level cache of the multi-level cache memory allocated to a corresponding processor core of the first virtual machine instance;
   cache manager circuitry to copy the portion of the network packet from the last level cache to the first level cache allocated to the corresponding processor core assigned to the first virtual machine instance; and
   instructions to cause the computing device to:
      allocate, prior to instantiation of the first virtual machine instance, one or more system resources to the first virtual machine instance to be instantiated;
      modify a guest operating system to include code usable to interact with a paravirtualization hypervisor of the host;
      install the modified guest operating system onto the paravirtualization hypervisor;
      place a plurality of descriptors of a memory buffer into a descriptor ring, ones of the descriptors to indicate a location in the memory allocated to the host in which the memory buffer resides; and share the memory buffer between the host and the first virtual machine instance.

7. The network computing device of claim 6, wherein to allocate the one or more system resources includes to allocate an amount of the memory buffer and at least one of the processor cores.

8. A computer-readable storage device or media disc comprising a plurality of instructions stored thereon that, in response to being executed, cause a network computing device to at least:
copy, by a host of the network computing device, at least a portion of a network packet received by the network computing device to a last level cache of a multi-level cache memory allocated to a processor of the network computing device, the processor including a plurality of processor cores, one of the processor cores assigned to the host, one or more of the other processor cores assigned to a corresponding virtual machine instance of a plurality of virtual machine instances executing on the network computing device;
determine, by the host, a first virtual machine instance of the plurality of virtual machine instances that is to process the portion of the network packet, the multi-level cache memory additionally including a first level cache of the multi-level cache memory allocated to a corresponding processor core of the first virtual machine instance;
inject, subsequent to having determined the first virtual machine instance, an interrupt into the processor core assigned the first virtual machine instance, the interrupt to indicate to the first virtual machine instance that the network packet is available to be processed; and
copy, by the host, the portion of the network packet from the last level cache to the first level cache allocated to the corresponding processor core assigned to the first virtual machine instance.

9. The computer-readable storage device or media disc of claim 8, wherein the host includes one of a host operating system or a host hypervisor.

10. The computer-readable storage device or media disc of claim 8, wherein the last level cache includes a portion of the multi-level cache memory shared between the host and the first virtual machine instance.

11. The computer-readable storage device or media disc of claim 8, wherein the plurality of instructions further cause the network computing device to determine, subsequent to having injected the interrupt, whether a fetch command has been received from the first virtual machine instance, and copy the portion of the network packet in response to the fetch command.

12. The computer-readable storage device or media disc of claim 8, wherein the plurality of instructions further cause the network computing device to copy the portion of the network packet to a descriptor ring, the descriptor ring shared between ones of the plurality of processor cores.

13. A storage device or media disc comprising a plurality of instructions stored thereon that, in response to being executed, cause a network computing device to at least:
copy, by a host of the network computing device, at least a portion of a network packet received by the network computing device to a last level cache of a multi-level cache memory allocated to a processor of the network computing device, the processor including a plurality of processor cores, one of the processor cores assigned to the host, one or more of the other processor cores assigned to a corresponding virtual machine instance of a plurality of virtual machine instances executing on the network computing device;
determine, by the host, a first virtual machine instance of the plurality of virtual machine instances that is to process the portion of the network packet, the multi-level cache memory including a first level cache of the multi-level cache memory allocated to a corresponding processor core of the first virtual machine instance;
copy, by the host, the portion of the network packet from the last level cache to the first level cache allocated to the corresponding processor core assigned to the first virtual machine instance;
allocate, prior to instantiation of the first virtual machine instance, one or more system resources to the first virtual machine instance;
modify a guest operating system to include code usable to interact with a paravirtualization hypervisor of the host;
install the modified guest operating system onto the paravirtualization hypervisor;
place a plurality of descriptors of a memory buffer into a descriptor ring, ones of the descriptors to indicate a location in the memory allocated to the host in which the memory buffer resides; and
share the memory buffer between the host and the first virtual machine instance.

14. The computer-readable storage device or media disc of claim 13, wherein the plurality of instructions cause the network computing device to allocate the one or more system resources by allocating an amount of the memory buffer and at least one of the processor cores.

15. A method for managing paravirtual network device queues and memory of a network computing device, the method comprising:
copying, by a host of the network computing device, at least a portion of a network packet received by the network computing device to a last level cache of a multi-level cache memory allocated to a processor of the network computing device, the processor including a plurality of processor cores, a first processor core of the processor cores assigned to the host, one or more second processor cores of the other processor cores assigned to ones of a plurality of virtual machine instances executing on the network computing device; and
determining, by the host, a first virtual machine instance of the plurality of virtual machine instances that is to process the portion of the network packet, the multi-level cache memory including a first level cache of the multi-level cache memory allocated to one of the second processor cores of the first virtual machine instance;
injecting, by the host and subsequent to having determined the first virtual machine instance, an interrupt into the processor core assigned the first virtual machine instance, the interrupt to indicate to the first virtual machine instance that the network packet is available to be processed; and
copying, by the host, the portion of the network packet from the last level cache to the first level cache allocated to the one of the second processor cores assigned to the first virtual machine instance.

16. The method of claim 15, wherein the copying includes copying by one of a host operating system or a host hypervisor.

17. The method of claim 15, wherein the copying to the last level cache includes copying to a portion of the multi-level cache memory shared between the host and the virtual machine instance.

18. The method of claim 15, further including determining, subsequent to having injected the interrupt, whether a fetch command has been received from the first virtual machine instance, the copying of the portion of the network packet performed in response to having received the fetch command.

19. The method of claim 15, wherein the copying of the portion of the network packet to the last level cache includes copying the portion of the network packet to a descriptor ring, the descriptor ring shared between ones of the plurality of processor cores.

20. A method for managing paravirtual network device queues and memory of a network computing device, the method comprising:
   copying, by a host of the network computing device, at least a portion of a network packet received by the network computing device to a last level cache of a multi-level cache memory allocated to a processor of the network computing device, the processor including a plurality of processor cores, a first processor core of the processor cores assigned to the host, one or more second processor cores of the other processor cores assigned to ones of a plurality of virtual machine instances executing on the network computing device;
   determining, by the host, a first virtual machine instance of the plurality of virtual machine instances that is to process the portion of the network packet, the multi-level cache memory including a first level cache of the multi-level cache memory allocated to one of the second processor cores of the first virtual machine instance;
   copying, by the host, the portion of the network packet from the last level cache to the first level cache allocated to the one of the second processor cores assigned to the first virtual machine instance;
   allocating, by the host and prior to instantiation of the first virtual machine instance, one or more system resources to the first virtual machine instance to be instantiated;
   modifying, by the host, a guest operating system to include code usable to interact with a paravirtualization hypervisor of the host;
   installing the modified guest operating system onto the paravirtualization hypervisor;
   placing, by the host, a plurality of descriptors of a memory buffer into a descriptor ring, ones of the descriptors indicative of a location in the memory allocated to the host in which the memory buffer resides; and
   sharing, by the host, the memory buffer between the host and the virtual machine instance.

21. The method of claim 20, wherein allocating the one or more system resources includes allocating an amount of the memory buffer and at least one of the processor cores.

22. An apparatus comprising:
   interface circuitry;
   instructions in the apparatus; and
   processor circuitry to execute the instruction to at least:
      copy at least a portion of a network packet received by a network computing device to a last level cache of a multi-level cache memory allocated to a processor of the network computing device, the processor to include a plurality of processor cores, one of the processor cores assigned to a host of the network computing device, one or more of the other processor cores assigned to one or more corresponding virtual machine instances of a plurality of virtual machine instances executing on the network computing device;
      determine a first virtual machine instance of the plurality of virtual machine instances that is to process the portion of the network packet based on data contained therein, the multi-level cache memory to include a first level cache of the multi-level cache memory allocated to a corresponding processor core of the first virtual machine instance;
      inject, subsequent to having determined the first virtual machine instance, an interrupt into the processor core assigned the first virtual machine instance, the interrupt to indicate to the first virtual machine instance that the network packet is available to be processed; and
      copy the portion of the network packet from the last level cache to the first level cache allocated to the corresponding processor core assigned to the first virtual machine instance.

23. The apparatus of claim 22, wherein the host includes one of a host operating system or a host hypervisor.

24. The apparatus of claim 22, wherein the last level cache includes a portion of the multi-level cache memory shared between the host and the virtual machine instance.

25. An apparatus, comprising:
   interface circuitry;
   instructions in the apparatus; and
   processor circuitry to execute the instructions to at least:
      copy at least a portion of a network packet received by a network computing device to a last level cache of a multi-level cache memory allocated to a processor of the network computing device, the processor to include a plurality of processor cores, one of the processor cores assigned to a host of the network computing device, one or more of the other processor cores assigned to one or more corresponding virtual machine instances of a plurality of virtual machine instances executing on the network computing device;
      determine a first virtual machine instance of the plurality of virtual machine instances that is to process the portion of the network packet based on data contained therein, the multi-level cache memory to include a first level cache of the multi-level cache memory allocated to a corresponding processor core of the first virtual machine instance;
      copy the portion of the network packet from the last level cache to the first level cache allocated to the corresponding processor core assigned to the first virtual machine instance;
      allocate, prior to instantiation of the first virtual machine instance, one or more system resources to the first virtual machine instance to be instantiated;
      modify a guest operating system to include code usable to interact with a paravirtualization hypervisor of the host;
      install the modified guest operating system onto the paravirtualization hypervisor;
      place a plurality of descriptors of a memory buffer into a descriptor ring, ones of the descriptors indicative of a location in memory allocated to the host in which the memory buffer resides; and
      share the memory buffer between the host and the virtual machine instance.

26. The apparatus of claim 25, wherein the host includes one of a host operating system or host hypervisor.

\* \* \* \* \*